United States Patent
Grigorov

[15] 3,680,255
[45] Aug. 1, 1972

[54] GRAFTING MACHINE FOR SEEDLING MATERIAL

[72] Inventor: Tzvetan Blagoev Grigorov, Plovdiv, Bulgaria

[73] Assignee: DMZ "Anton Ivanov", Plovdiv, Bulgaria

[22] Filed: Dec. 17, 1970

[21] Appl. No.: 99,164

[52] U.S. Cl. .................................................. 47/6
[51] Int. Cl. ........................................... A01g 1/06
[58] Field of Search ............................. 47/1, 6; 144/90–91

[56] References Cited

UNITED STATES PATENTS

| | | | |
|---|---|---|---|
| 21,700 | 10/1858 | Rockwell | 47/6 |
| 348,592 | 9/1886 | Speer | 47/6 |

FOREIGN PATENTS OR APPLICATIONS

| | | |
|---|---|---|
| 398,070 | 5/1909 | France |
| 148,993 | 4/1962 | U.S.S.R. |

*Primary Examiner*—Robert E. Bagwill
*Attorney*—Arthur O. Klein

[57] ABSTRACT

A machine for cutting the ends of root stock and scions to complementary shapes and for automatically positioning the cut ends thereof together. Root stock and scion are superimposed in oppositely extending positions and are cut off by the operative stroke of the profile knife. The reverse, inoperative stroke of the knife carries the root stock and scion with the knife until they engage an appropriately adjusted abutment, thereby causing the cut ends of the root stock and scion to be slid into mating relationship.

7 Claims, 11 Drawing Figures

PATENTED AUG 1 1972

INVENTOR:
TZVETAN BLAGOEV GRIGOROV
BY: *Arthur O. Klein*

Attorney

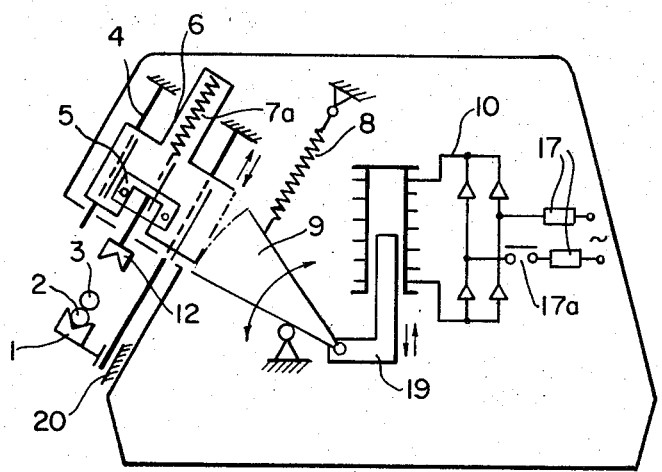
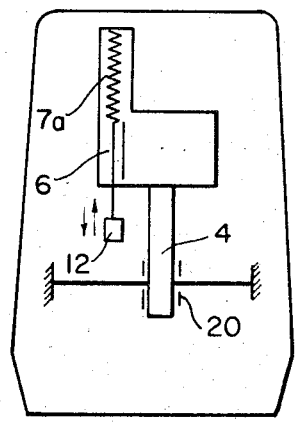
FIG. 4  FIG. 5
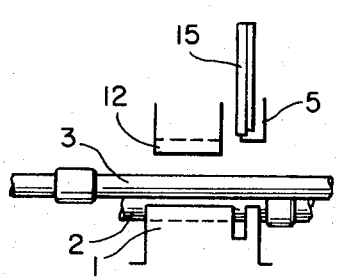
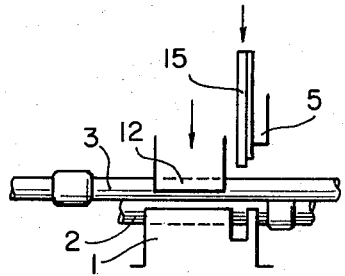
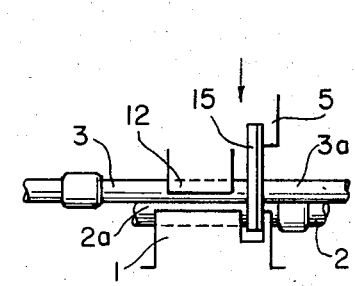
FIG. 6a  FIG. 6b  FIG. 6c
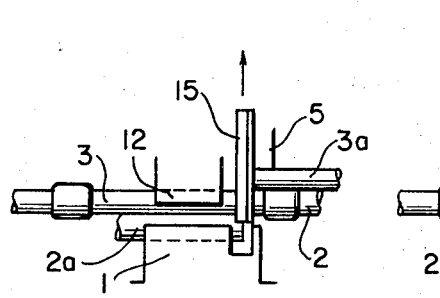
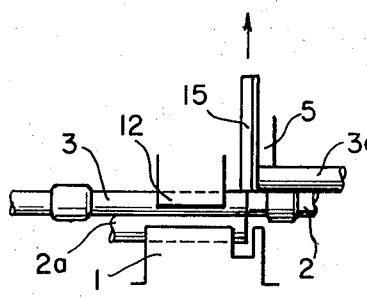
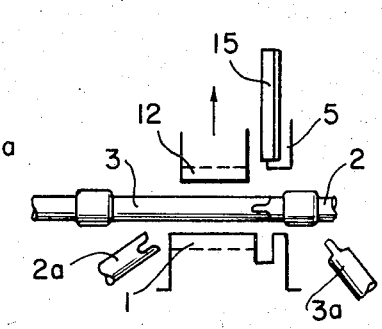
FIG. 6d  FIG. 6e  FIG. 6f

GRAFTING MACHINE FOR SEEDLING MATERIAL

The present invention relates to a machine for preparing the mating ends of the stems of root stock and the scions of seedling materials which are to be grafted. Such material includes decorative bushes, nut trees, almond trees, and the like. The apparatus or grafting machine of the invention is particularly characterized by its ease and economy of operation, its high productivity, the stability of the joints made by it between the root stock and the scions, the high percentage of successful grafts produced thereby, and the production of a greater number of first-class seedling materials.

A prior machine for performing such operation is one made, sold and used in Bulgaria which is designated by the title LPM–1; such machine is made in the Anton Ivanov State Machine Building Plant in the town of Plovdiv, Bulgaria. It performs the entire cycle of engrafting in two work strokes and four cycles. The use of such machine results in an improvement of at least 10 percent in the number of grafts which are successful and the number of first-class vine seedlings produced as compared to manual engrafting. Such known machine, however, is a complex device which is quite costly, is rather difficult to operate and maintain, and is of such design that its rate of productivity cannot be improved.

The present invention has among its objects the provision of an improved machine for performing the process of engrafting seedlings. It has the advantage of a simplified construction with no complex elements, which permits it to be made at a much lower cost price. In addition, it is easily operated and easily maintained. The machine performs the engrafting process automatically in two cycles and one working stroke, thus permitting a much higher rate of productivity than the former machine. The apparatus has only one element, an abutment, which requires adjustment for the different kinds of material to be treated by the apparatus. There is an indicating mechanism or scale for such adjustable abutment, which is preferably located conveniently on the front lid or panel of the apparatus. Such scale is an important part of the apparatus, and contributes greatly to the high efficiency of the machine and the ease with which it is operated by unskilled workers.

Despite its simplified construction and manner of operation, the machine of the invention produces a much higher percentage of first-class engrafted material, since it treats both the root stock and the scion material in accordance with the best agro-technical procedures. In one illustrative, preferred embodiment of the apparatus, the necessary motion of the parts is obtained directly, with no transformations, from a direct current operated electromagnet, to which is applied the voltage of a normal direct current power network. As an alternative, the machine can also be operated by means of a foot lever, without very appreciable diminution of its rate of production.

In the drawings accompanying the specification and forming a part thereof:

FIG. 4 is a schematic kinematic diagram of the grafting machine as it is shown in FIG. 1;

FIG. 5 is a schematic kinematic view of the machine as it is shown in FIG. 2; and FIGS. 6a to 6f, inclusive, are schematic views showing successive steps in the working cycle of the illustrative grafting machine.

Figure 1:
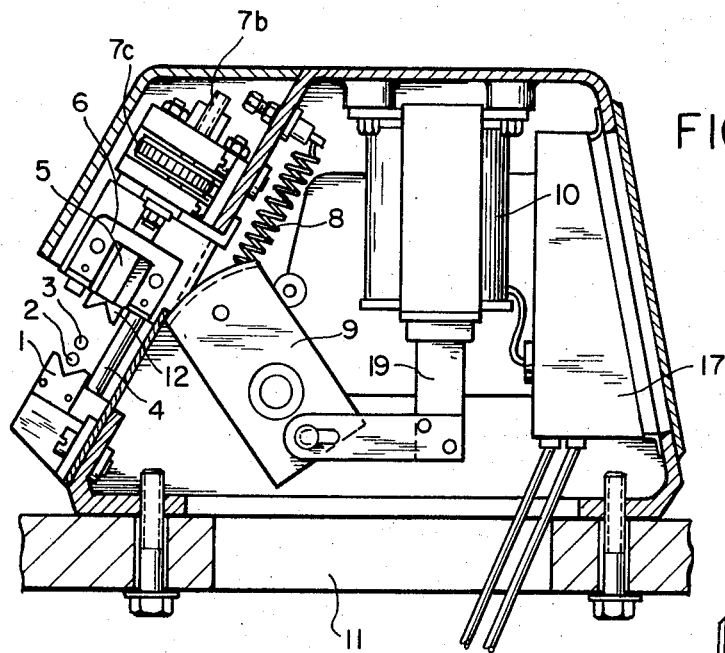
FIG. 1 is a fragmentary view in longitudinal vertical section through a first illustrative embodiment of the apparatus in accordance with the invention.
Figure 2:
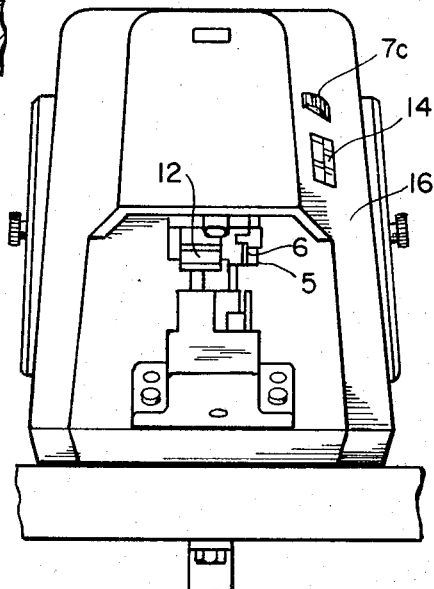
FIG. 2 is a fragmentary view in end elevation of the portion of the apparatus shown in FIG. 1, the view being taken in the direction from left to right in FIG. 1.

In FIGS. 1 and 2 there is shown a first embodiment of a grafting machine for seedlings in accordance with the invention, such machine having a body 16 upon which there is fixedly mounted a lower supporting jaw 1 having a broad V-shaped seat for the reception of one of the seedling elements to be grafted; in this instance the lower supporting jaw 1 is shown supporting a scion element 2 upon which a root stock 3 is superimposed. The lower supporting jaw 1 is preferably disposed at a convenient angle as shown, there being a confronting movable upper jaw 12 which reciprocates toward and away from the jaw 1. The upper jaw 12 is supported upon a reciprocable carriage 6 which is guided for movement toward and away from the lower jaw 1 upon two spaced parallel cylindrical guide rods 4. The upper jaw 12 is constantly urged toward its extended lower position, shown in FIGS. 4 and 5, wherein it lies in advance or downwardly of the carriage 6, by a yieldable means such as a coil compression spring 7a (FIGS. 4 and 5) which abuts at its upper end a spring abutment affixed to carriage 6 and at its lower end the upper end of a reciprocable rod affixed to the upper jaw 12 and slidable in carriage 6.

Figure 3:
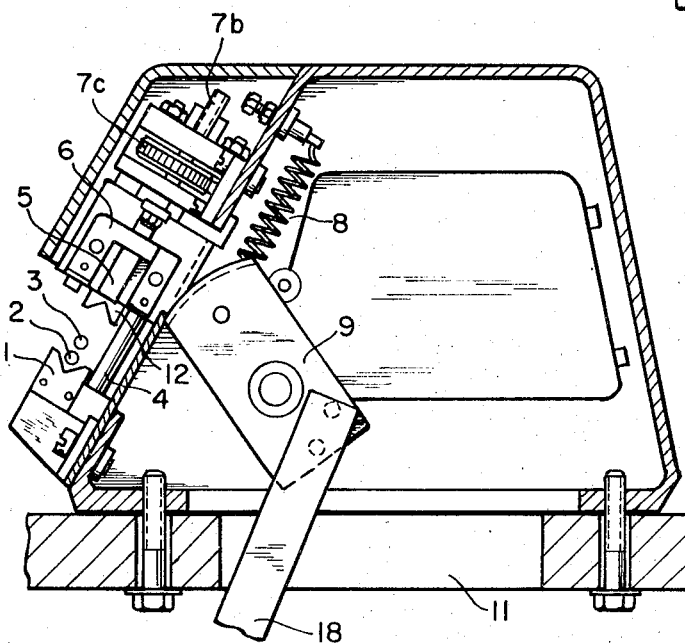
FIG. 3 is a view similar to FIG. 1 of a second embodiment of apparatus in accordance with the invention.

The carriage 6 is reciprocated by means of a lever 9 in the form of a toothed quadrant which meshes with a rack gear affixed to the side of the carriage 6 which confronts the lever 9. A coil tension spring 8 affixed at its upper end to fixed structure is connected at its lower end to the upper arm of the lever 9 so as constantly to urge the lever in a clockwise direction as it is shown in FIG. 1. A direct current powered electromagnet 10 has the plunger or armature 19 thereof pivotally connected by a link to the lower end of the lever 9 as shown. Upon the energizing of the electromagnet 10 the armature thereof is drawn upwardly, whereby to swing the lever 9 counterclockwise against the opposition of the spring 8. In the alternative embodiment of FIG. 3 the lever 9 is operated by a foot treadle device (not shown) which operates a pushrod 18 the upper end of which is pivotally connected to the lower end of the lever 9, as shown.

In both illustrative embodiments the apparatus is mounted upon a work table 11 which has a convenient height such as 720 mm. Table 11 may also conveniently have a working area of 450 to 950 mm$^2$. The apparatus has an inclined front panel, to which the rods 4 lie parallel and to which they are affixed. There is an adjustable abutment 5 mounted on such panel to which there is connected a pointer 14 and a means 13 by which the abutment may be adjusted. Abutment 5 is adjusted by a screw 7b attached thereto such screw being received within a nut 7c rotatably mounted on the panel and held from axial travel with respect thereto. The carriage 6 has a knife 15 affixed thereto, such knife being of thin-walled profile shape, sharpened on its lower end, such that when it is lowered, it cuts off the right hand end 3a of the root stock 3 and the left hand end 2a of the scion 2. In so doing, it cuts a slot into the left hand ends of the root stock and scion, as shown in FIG. 6f and a pointed end, complementary to the slot, in the right hand end of the scion and root stock. The apparatus also includes a switchboard 17 carrying a switch 17a by which the electromagnet 10 is selectively energized.

The machine of the invention performs the working cycle of engrafting automatically in one working stroke and two cycles. FIGS. 6a, 6b, and 6c show successive steps in the first cycle, and FIGS. 6d, 6e, and 6f show successive steps in the second cycle. During the first cycle, when the carriage 6 moves downwardly, the scion 2 with the root stock 3 held closely upon it are placed on the supporting lower jaw 1 and are held in such position by the spring biased upper jaw 12. Continued downward motion of the carriage 6 carries the profile knife 15 downwardly so as to cut the described slot in the right end of the root stock and the projecting member in the left end of the scion. In the second cycle, the carriage 6 moves upwardly, back toward its initial position, where the root stock element and the scion element 2 just cut may then be displaced and joined, the useless end pieces 3a and 2a thereof dropping away. Such operation may conveniently be performed by placing the scion 2 by the operator's right hand upon the lower supporting jaw 1, the left hand of the operator then bringing the root stock 3 into position, superimposed upon the scion 2. In the first embodiment, electromagnet 10 is then energized by closing its main supply switch; alternatively (FIG. 3) the foot pedal of the apparatus may be operated to thrust pushrod 18 upwardly. The carriage 6 is then moved by means of the toothed lever 9. One of the inclined planes of the upper holding jaw 12 is the first to reach the root stock 3. The latter needs a final adjustment by slipping it upon the scion 2, so that it is presented to the profile cutting knife 15 in the correct position. The profile cutting knife 15 cuts in succession the root stock 3 and then the scion 2. After the carriage 6 has reached the bottom of its stroke, the first cycle of the working stroke of the machine is completed. The operations performed are the initial presentation of root stock and scion, adjusting, pressing, and cutting, which are part of the whole process of engrafting.

When the main supply switch for the electromagnet is open, the circuit is broken and no electric power reaches the magnet. The retracting spring 8, which is joined to the toothed lever 9 and the body of the apparatus, causes the carriage 6 to move upwardly. The cut elements, that is, the scion head 2a and the useless piece 3a from the root stock 3, being still held in the profile knife 15, travel upwardly with the profile knife. At a distance equal to the thickness of the material treated, the joint motion of the cut pieces ceases since the root stock 3 then engages the adjustable abutment 5. The profile knife 15 continues then to move alone, leaving the displaced elements in the FIG. 6e position. When the upper gripping jaw 3 reaches the upper end of its stroke the operator with his left hand holds the root stock 3 and with his right hand holds the scion 2.

The useless pieces 2a, 3a which have been cut off from the root stock and the scion fall out of the way. This completes the second cycle of the working stroke of the machine, such machine having performed the operations of displacement, joining, and clearing of the whole process of engrafting. The remaining operation of binding the joint is carried out in a conventional manner.

The machine can operate with profile knives 15 of various geometrical shapes, as desired, which provide for the holding of the cut elements in the knife until such root stalk and scion are slid so that the cut ends thereof are brought into engagement. In the illustrative machine described hereinabove, the profile knife 15 is of such shape as to prepare the root stock and scion for a symmetrical saddle graft.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A grafting machine comprising first and second jaws for holding elements consisting of a scion and a root stock in superimposed relationship, a carriage movable toward and away from the first jaw, said second jaw yieldably mounted on the carriage to cooperate with the first jaw to grip the elements therebetween when the carriage is advanced, means connected with said carriage to reciprocate the same, and a profile knife mounted on the carriage to cut the superimposed gripping elements when the carriage advances in a later portion of its operative stroke, the profile knife being of such shape as to cut the opposed ends of the respective elements into complementary shapes.

2. A machine according to claim 1, wherein the profile knife has a generally cup shape in transverse section, whereby the cut-off end portion of one of the elements and the cut end of the other of the elements which engage the inner walls of the profile knife travel with the knife in the initial portion of the return, inoperative stroke of the knife.

3. A machine according to claim 2, comprising an abutment disposed alongside the hollow side of the knife to engage the later cut element after the cut end of the first cut element has been removed, whereby to align the later cut element with the first cut element.

4. A machine according to claim 3, comprising means to adjust the abutment along the path of travel of the knife.

5. A machine according to claim 1, comprising electromagnetic means for reciprocating said carriage.

6. A machine according to claim 5, wherein the electromagnetic means comprises an electromagnet having a reciprocable armature, a source of energizing current for the electromagnet, and means drivingly connecting the armature to the carriage.

7. A machine according to claim 6, wherein said means drivingly connecting the armature to the carriage comprises a toothed quadrant lever, a rack gear on the carriage meshing with the teeth on the lever, yieldable means urging the lever in one direction, and means connecting the armature of the electromagnet to the lever so that when the electromagnet is energized, the armature thereof moves to drive the lever in opposition to the yieldable means.

* * * * *